United States Patent Office 3,769,316
Patented Oct. 30, 1973

3,769,316
PROSTAGLANDIN INTERMEDIATES
Robert B. Morin, Middleton, Wis., Douglas O. Spry, Indianapolis, and Kenneth L. Hauser, Greencastle, Ind., and Richard A. Mueller, Glencoe, Ill., assignors to Eli Lilly and Company, Indianapolis, Ind.
No Drawing. Original application Dec. 16, 1968, Ser. No. 784,225. Divided and this application Oct. 8, 1971, Ser. No. 187,829
Int. Cl. C07c 61/36
U.S. Cl. 260—468 K         3 Claims

ABSTRACT OF THE DISCLOSURE

Prostaglandins are synthesized from o-methoxyphenylacetic acid by introduction of a proper acid side chain, conversion of the aromatic nucleus to the cyclopentane nucleus, and introduction of the second side chain. Key intermediates in this synthesis are the acid having the formula:

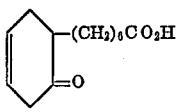

and the esters thereof.

CROSS-REFERENCE

This application is a division of our co-pending application Ser. No. 784,225, filed Dec. 16, 1968, now Pat. No. 3,644,502.

BACKGROUND OF THE INVENTION

The prostaglandins are members of a new hormonal system, the discovery of which dates back to 1930 when physiological effects which were later found to be ascribable to prostaglandins were reported. The members of this family are $C_{20}$ unsaturated acids containing a five-membered ring in the structure. A number of naturally occurring prostaglandins have been reported to date.

Members of the prostaglandin family have been shown to be very potent physiologically. Certain aspects of this work are described by Bergstrom, Science 157, 382 (1967). Among the effects that have been shown for prostaglondins are a marked lowering of blood pressure, either contraction or relaxation of smooth muscle tissue, and inhibition of the release of free fatty acids from fat pads. For example, infusion of $PGE_1$ in humans resulted in an increase in heart rate and a fall in arterial blood pressure.

Although the prostaglandins have been found in a number of tissues, their concentrations in these tissues are extremely small. For example, 13 different prostaglandins have been found in a total concentration of about 300 micrograms per milliliter of human seminal plasma. This is by far the highest concentration observed in any tissue to date. Because of these extremely low concentrations it is impossible to obtain sufficient quantities of the prostaglandins from natural sources. Among the more recent approaches to prostaglandin synthesis are those reported by E. J. Corey and coworkers, J. Am. Chem. Soc. 90, 3245 and 3247 (1968).

SUMMARY

We have now discovered a new synthetic route to members of the prostaglandin family from o-methoxyphenylacetic acid by introduction of a proper acid side chain, conversion of the aromatic nucleus to the cyclopentane nucleus, and introduction of the second side chain. Our synthesis is a multistep synthesis involving a large number of chemical reactions, all of which are known to those skilled in the art.

In the course of our synthesis we have discovered a novel acid having the formula:

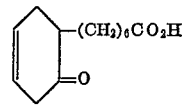

This acid and its esters are important intermediates in the preparation of prostaglandins.

DESCRIPTION OF THE PREFERRED EMBODIMENT

The starting material for our synthesis is o-methoxyphenylacetic acid. This material is available commercially or may be readily synthesized from o-hydroxyphenylacetic acid by formation of the methyl ether by any convenient means such as, for example, treatment with dimethyl sulfate. The series of reactions involved in our synthesis may be depicted by the following schematic representation.

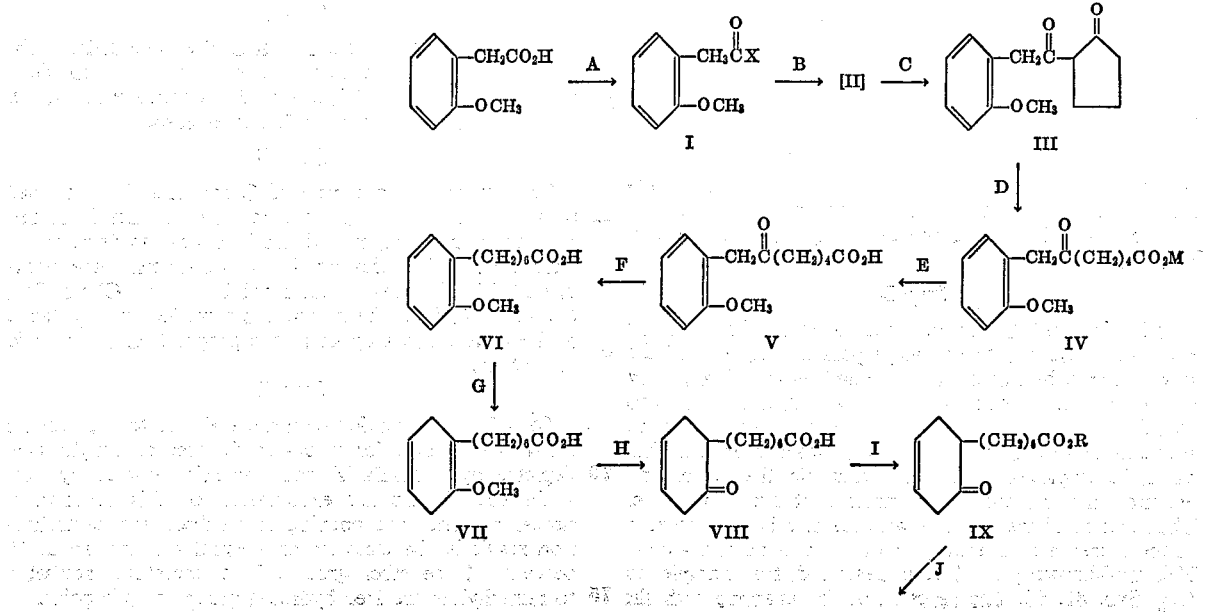

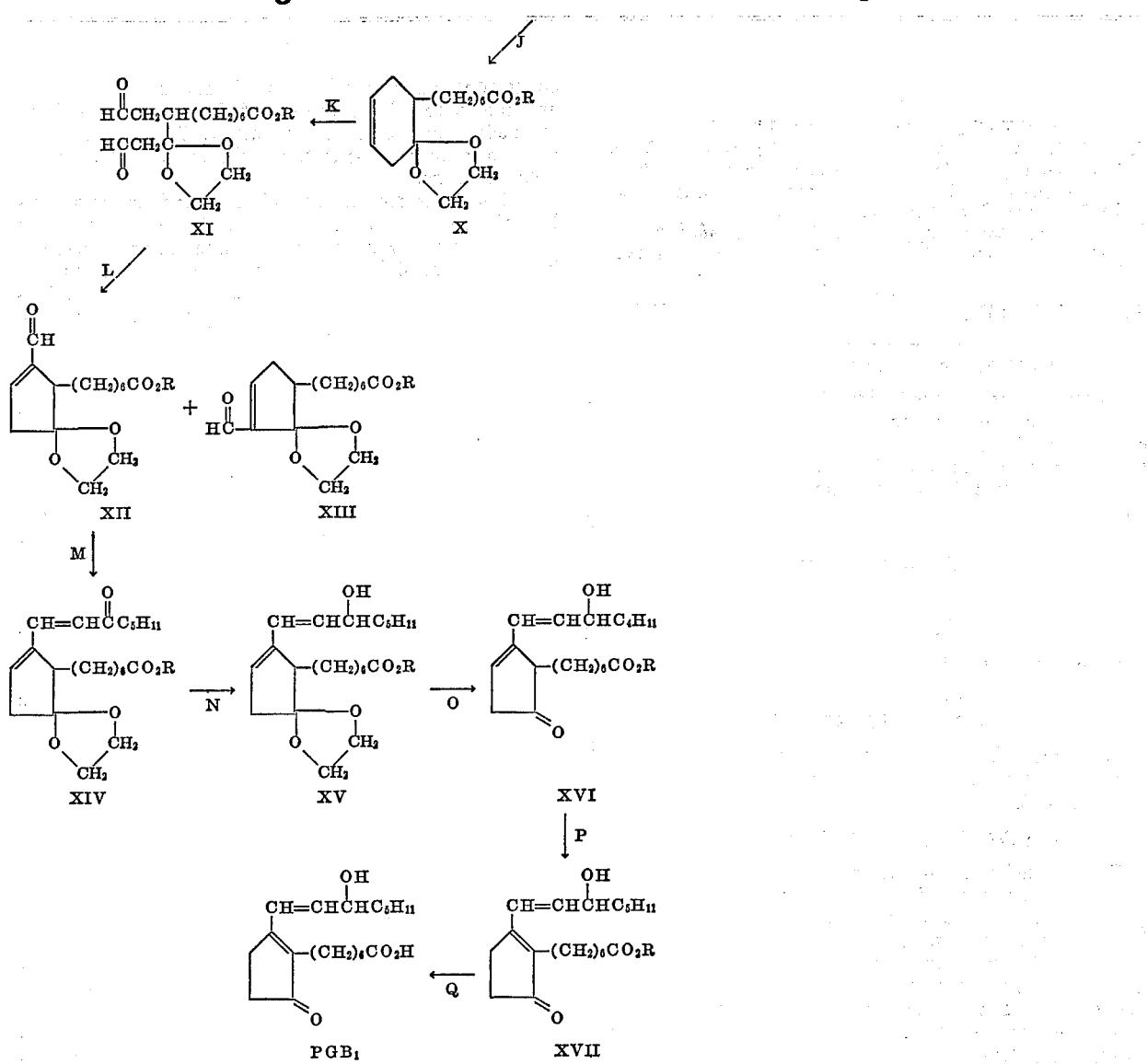

Step A

The first step in the synthesis is the conversion of o-methoxyphenylacetic acid to the corresponding acid halide. The conversion of a carboxylic acid to the corresponding acid halide is a well-known reaction. Reagents that may be employed for this preparation include oxalyl chloride, phosphorus pentachloride, phosphorus oxychloride, phosphorus oxybromide, thionyl chloride, phosphorus tribromide, and phosphorus triiodide. The reaction is preferably conducted in an inert solvent such as chloroform, ether, methylene chloride, benzene, or toluene. The preferred acid halide for use in our synthesis is the acid chloride.

Step B

It is also well known to react an acid halide with an enamine of cyclopentanone to prepare a compound of the type depicted by Formula III. Enamines are obtained by the reaction of secondary amines with ketones. We have found the morpholino enamine of cyclopentanone to be particularly useful in our process. Other enamines that might be employed include, for example, the pyrrolidino enamine and the piperidino enamine of cyclopentanone. The reaction of the enamine with the acid halide proceeds in the presence of a tertiary amine such as triethyl amine. This well-known procedure is described, for example, in Org. Syn. 41, 65. The reaction of the enamine with the acid halide actually results in an intermediate compound which must be further treated to obtain Compound III.

Step C

To obtain Compound III from the intermediate obtained in Step B it is necessary to treat the intermediate with a mineral acid. This step is also a well-known step in the reaction of enamines with acid halides.

Step D

The cyclopentanone ring of Compound III is opened by treatment with a strong base. The product from this ring opening in the salt of the keto acid as depicted by Formula IV. This cleavage is the well-known base cleavage of 1,3-diketones as described in J. Am. Chem. Soc. 67, 2204 (1945). The reaction is a well-known synthetic tool and is utilized by us in the preparation of the acid side chain.

Step E

Step E is the addition of a mineral acid to the product from Step D in order to obtain the free carboxylic acid depicted by Formula V from the salt depicted by Formula IV. No further explanation of this reaction is necessary. The ring opening and subsequent neutralization result in the cleavage of a small amount, about 10 percent, of the ether groups. It is, therefore, advisable to remethylate the free hydroxyl groups at this point.

Step F

Step F involves reduction of the carbonyl group in the side chain to a methylene group. This can be accomplished by a Wolff-Kishner reduction. In the process, the hydrazone of the carbonyl group is first formed and this is then decomposed by treatment with a base. Bases that can be employed include potassium hydroxide, sodium hydroxide, potassium ethoxide, sodium methoxide, and similar materials.

Step G

Step G also involves reduction; however, in this step the benzene ring is reduced to the cyclohexadiene ring. This reduction is accomplished by means of the Birch reduction in which an alkali metal and ammonia are employed as the reducing agent. In our synthesis we have found the use of lithium and ammonia in the presence of isopropyl alcohol as solvent to be most advantageous. In this manner Compound VI is converted to Compound VII.

Step H

Cleavage of the ether group in Compound VII results in the formation of the ketone having Formula VIII. We have found the use of oxalic acid to be particularly well suited for this cleavage reaction.

Step I

Before proceeding further it is necessary to protect the carboxyl group by the formation of an ester. The ester could have been prepared prior to the ether cleavage of Step H. Since the function of the ester preparation is merely to protect the carboxyl group during subsequent reactions, the particular ester employed is unimportant. However, since it will be necessary to hydrolyze the ester in order to obtain $PGB_1$ as the free acid, it is suggested that the ester formed be one that may be easily cleaved. Thus R in Formula IX and subsequent formulas may be virtually any group representing the alcohol portion of the ester. For example, R may be an alkyl or aralkyl group such as methyl, ethyl, t-butyl, 2,2,2-trichloroethyl, propyl, nonyl, benzyl, and diphenylmethyl. From a practical standpoint, the ease of cleaving the ester prepared must be balanced against the ease of preparation of the ester. We have found the methyl ester to strike such a balance. The methyl ester may be readily prepared by reacting the acid with diazomethane. Other methods of ester preparation are well known to those skilled in the art. The particular method chosen does not affect our synthesis.

Step J

It is also necessary at this point to protect the carbonyl group during subsequent reactions. Methods of protecting carbonyl groups are also well known to those skilled in the art. We have found that we can prepare a ketal from ethylene carbonate using p-toluenesulfonic acid as catalyst in the presence of ethylene glycol. This ketal serves to protect the carbonyl function but may be readily removed by acid hydrolysis at a later step. Other carbonyl protecting groups may also be employed.

Step K

At this point in our synthesis we open the 6-membered ring. As a first step in this ring cleavage the ozonide is formed at the double bond by reacting Compound X with ozone. Again, ozonolysis of a double bond is a well known reaction. The addition of ozone to a double bond occurs readily at low temperatures. Reductive cleavage of the ozonide results in the formation of the dialdehyde (XI). This may be accomplished by treatment with zinc dust and acetic acid.

Step L

The dialdehyde is then made to undergo ring closure to give a cyclopentenal. This ring closure can occur, and in fact does occur, in two ways so that two isomers, (XII) and (XIII), are obtained. The ring closure can be effected by treatment with a hindered secondary amine in an inert solvent. Preferred solvents are aromatic hydrocarbons such as benzene, toluene and xylene. The preferred hindered secondary amine is 3-azabicyclo[3.2.2]nonane. Other hindered secondary amines such as 2,2,5,5-tetramethylpyrrolidine and 2,2,6,6-tetramethylpiperidine may also be used. The isomeric cyclopentenals formed are separated from each other by chromatography using a mixture of chloroform and benzene as solvent on a silica column.

Step M

The cyclopentenal to be employed in Step M is that represented by Formula XII. In this step the long side chain is introduced into the molecule by the reaction of Compound XII with the Wittig reagent obtained from triphenyl phosphine and 1-bromoheptanone-2. The Wittig reaction employed in this step of the synthesis is a well-known reaction. The preparation of the Wittig reagent employed by us is depicted by the following equations:

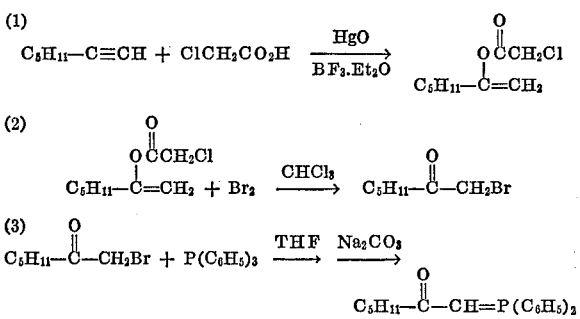

Step N

The next step of our synthesis is the reduction of the carbonyl group in the side chain to a hydroxyl group. We have found the use of sodium borohydride in tetrahydrofuran as solvent to be an excellent method of performing this reduction. Skilled chemists will be able to devise other means of reducing this carbonyl group. The means employed is not important to our process so long as the carbonyl group is reduced to a hydroxyl group.

Step O

In order to regenerate the carbonyl group in the ring the ketal is cleaved by treatment with acid. This acid cleavage of ketals may be effected with a strong organic acid such as p-toluene-sulfonic acid or with a mineral acid such as hydrochloric or phosphoric acid. It is this sensitivity to acid treatment that makes ketals so suitable for the protection of carbonyl groups. We have found this particular ketal cleavage to proceed using p-toluene-sulfonic acid in acetone at a temperature of 25° to 30° C.

Step P

In order to convert Compound XVI into an ester of $PGB_1$ it is necessary to shift the double bond in the ring. This isomerization occurs on treatment with a mild base. For example, treatment of (XVI) with dilute aqueous sodium hydroxide at room temperature results in complete isomerization to (XVII) in a few minutes. The isomerization will occur under conditions sufficiently mild that no hydrolysis of the ester occurs.

Step Q

The esters of $PGB_1$ exhibit the same biological activity as does the free acid. Therefore, it is unnecessary to convert the ester (XVII) to the free acid. However, for complete synthesis of $PGB_1$ the ester may be subjected to basic hydrolysis to cleave the ester followed by neutralization with a mineral acid to yield $PGB_1$ acid. Compound XVII is readily hydrolyzed upon heating with aqueous alkali. Neutralization of the solution upon completion of the hydrolysis results in the formation of $PGB_1$.

Our invention will be further illustrated by the following specific examples:

EXAMPLE 1

To a solution of 50 g. of o-hydroxyphenylacetic acid in 500 ml. of benzene were added dimethyl sulfate and sodium hydroxide to methylate the hydroxyl group. At the completion of the reaction approximately 100 ml. of the benzene was distilled in order to dry the acid. This solution was used directly in the next step.

EXAMPLE 2

To the solution from Example 1 was added 96 ml. of oxalyl chloride and the mixture was heated under reflux for 30 minutes. The benzene was removed by evaporation and the residue was distilled to give 29.3 g. of acid chloride with a boiling point of 110°–115° C. The acid chloride was used directly in the next step.

EXAMPLE 3

The product from Example 2 was dissolved in 100 ml. of dry chloroform and the solution was added over a 12-minute period to a stirred solution of 22.6 g. of the morpholino enamine of cyclopentanone and 14.97 g. of triethylamine in 100 ml. of dry chloroform. During the addition the temperature of the mixture rose to 53° C. Upon completion of the addition the mixture was heated and stirred at 60° C. for one hour. To the mixture was then added 60 ml. of 6 N hydrochloric acid and stirring was continued at 55° C. fo 30 minutes. The chloroform layer was separated and washed successively with water and saturated sodium bicarbonate solution. This product gave a violet ferric chloride test in ethanol. This solution of (o-methoxyphenyl)acetylcyclopentanone was used directly in the next step.

EXAMPLE 4

To the solution from Example 3 was added 6.2 g. of sodium hydroxide in 180 ml. of 50 percent ethanol and the mixture was heated under reflux for 5½ hours. The solvents were removed by evaporation. The residual oil was dissolved in water and the aqueous solution was washed twice with ether. This aqueous solution was then acidified to a pH of 2 by the addition of concentrated hydrochloric acid. The acidified solution was extracted with ether and the ether extract was washed successively with 1 N hydrochloric acid, water, and saturated sodium chloride solution, dried, and the ether evaporated to give 24.2 g. of product. The crude product was recrystallized from a mixture of ether and petroleum ether to yield 19.5 g. of purified product having a melting point of 58–60° C.

During the course of this reaction a small amount, perhaps 10 percent, of the methoxy groups are cleaved to the phenol so that it is recommended at this point that the product be remethylated using dimethyl sulfate and sodium hydroxide as described in Example 1.

EXAMPLE 5

The keto acid from Example 4 was subjected to a Wolff-Kishner reduction in accordance with the following procedure. A mixture of 19.5 g. of the keto acid, 87 ml. of diethylene glycol, 32.9 ml. of 85 percent hydrazine hydrate, and 4.6 g. of potassium hydroxide was heated under reflux for three hours. To this mixture was then added 87 ml. of diethylene glycol and 23.9 g. of potassium hydroxide and the mixture was again heated to 200° C. The reaction mixture was cooled and diluted by the addition of 600 ml. of ice and water. The mixture was acidified with 60 ml. of concentrated hydrochloric acid and extracted with ether. The ether extract was evaporated to yield 18 g. of an oil which crystallized on standing. This crystalline product had a melting point of 59–60° C.

EXAMPLE 6

To a three-neck, 12-liter flask equipped with a Dry Ice condenser and a mechanical stirrer were added 2 l. of ammonia that had been distilled from sodium, 40.12 g. of the acid prepared as in Example 5, and 1 l. of dry isopropanol. To this mixture was slowly added 20 g. of lithium metal in pieces over a 25-minute period. When the solution turned white another 10 g. of lithium was added and the mixture was refluxed until it turned white, approximately 25 minutes. To the mixture was slowly added 320 ml. of ethanol followed by 500 ml. of water. The ammonia was removed by evaporation, and the mixture was acidified to a pH of 1 by the addition of concentrated hydrochloric acid while cooling. The alcohol was tripped off and the residue was taken up in ether. The ether solution was washed successively with water and saturated sodium chloride solution, dried, and evaporated to give the cyclohexadiene acid.

EXAMPLE 7

At this point, the acid from Example 6 was treated with diazomethane to yield 27.6 g. of the methyl ester. The esterification reaction could as easily have been performed at some later step prior to the ozonolysis.

EXAMPLE 8

The ester from Example 7 was converted to the cyclohexenone by dissolving in 700 ml. of ethanol and adding 85 ml. of water and 40 g. of oxalic acid. The solution was allowed to stand at room temperature for three hours. The ethanol was removed by evaporation and the residue was extracted with ether. The ether extract was washed successively with 1 N sodium hydroxide and saturated sodium chloride solution, dried, and evaporated to give 25.05 g. of product. The pure ketone was obtained by distillation on a spinning band column with the product being collected at an overhead temperature of 133 C. and a pressure of 1.5 mm. The nuclear magnetic resonance, infrared, and ultraviolet spectra were consistent with structure (IX).

*Analysis.*—Calculated for $C_{14}H_{22}O_3$ (percent): C, 70.55; H, 9.31. Found (percent): C, 70.67; H, 9.48.

EXAMPLE 9

The ketone from Example 8 was converted to the ketal in the following manner. In a 500 ml. flask were combined 8.0 g. of the keto ester from Example 8, 166 ml. of dried tetrahydrofuran, 43 ml. of dried ethylene glycol, and 9.0 g. of ethylene carbonate. To this mixture was added 86 g. of p-toluenesulfonic acid and the mixture was allowed to stand at room temperature for five hours. At the end of this time the reaction mixture was dissolved in ether and the ether solution was washed successively with 1 N sodium hydroxide, water, and saturated sodium chloride solution, dried, and evaporated to yield 9.6 g. of product. An analytical sample of the ketal was obtained by distillation on a spinning band column at 158° C. and 1.5 mm. pressure. The nuclear magnetic resonance and infrared spectra were consistent with Formula X.

*Analysis.*—Calculated for $C_{16}H_{26}O_4$ (percent): C, 68.05; H, 9.28. Found (percent): C, 68.40; H, 9.23.

EXAMPLE 10

A solution of 2.0 g. of the ketal ester from Example 9 in 140 ml. of chloroform was cooled in a salt-ice bath and ozone was added until the solution turned blue. This required approximately 30 minutes. The reaction mixture was flushed with nitrogen and transferred to a 500 ml. suction flask cooled in an ice bath. The ozonide was decomposed under nitrogen by the addition of 40 ml. of 75 percent acetic acid and 4 g. of zinc dust. This mixture was allowed to stand for one hour and was filtered. The filtrate was washed with water and the pH was adjusted to 7 by the addition of saturated sodium bicarbonate solution. The chloroform layer was then washed with water and sodium chloride solution and dried over sodium sulfate. Evaporation of the chloroform gave 1.8 g. of an oil. The nuclear magnetic resonance and infrared spectra were consistent with the expected dialdehyde having structure (XI).

EXAMPLE 11

A solution of 10.05 g. of the dialdehyde prepared as described in Example 10 in 100 ml. of benzene was added dropwise slowly over a period of one hour to a stirred, cooled (6° C.) solution of 3-azabicyclo[3.2.2]nonane in 600 ml. of benzene. The reaction mixture was stirred under a nitrogen atmosphere for an additional 45 minutes with cooling to the extent that benzene crystals formed. The mixture was slowly warmed to melt the benzene and then adjusted to pH 5 by the addition of 1 N hydrochloric acid. The benzene layer was separated, washed successively with water, sodium bicarbonate solution, and saturated sodium chloride solution, and dried over sodium sulfate. Evaporation of the benzene gave 8.54 g. of a brown oil which was shown to contain the isomeric cyclopentenals having structures (XII) and (XIII) as well as some ketal ester having a fully saturated 6-membered ring. This three component mixture was separated by chromatography on a silica column using a weight ratio of product to silica of 1:10 and a solvent consisting of 20 percent chloroform and 80 percent benzene. The column employed was 2½ cm. in diameter and 20 cm. long. Product (XII) was identified by nuclear magnetic resonance, infrared, and ultraviolet spectra, and elemental analysis.

*Analysis.*—Calculated for $C_{16}H_{24}O_5$ (percent): C, 64.84; H, 8.16. Found (percent): C, 65.06; H, 7.92.

EXAMPLE 12

A Wittig reagent to be reacted with Compound XII was prepared by the following sequence of steps.

(a) To 18 g. of red mercuric oxide in a 3-neck, 2-liter round-bottom flask, equipped with a mechanical stirrer and a 500 ml. addition funnel were added 12 ml. of anhydrous methanol and 12 ml. of boron trifluoride etherate. The mixture became warm. It was heated with stirring to the boiling point of methanol and then cooled to room temperature. To this catalyst mixture was added 295 g. of chloroacetic acid. While the mixture was stirred and cooled 300 g. of 1-heptyne was added dropwise over a one-hour period. The reaction mixture turned a brown-black color. The reaction was allowed to proceed at room temperature for an additional hour. The reaction mixture was extracted with 900 ml. of ether and the ether layer was washed three times with water, three times with sodium bicarbonate solution, and three times with sodium chloride solution, and dried over sodium sulfate. Evaporation of the ether left a brown oil which was distilled to give 342.8 g. of product boiling at 103°–107° C. at 9 mm. pressure.

(b) To a stirred, cooled (—5° C.) solution of the 343 g. of the enol acetate from (a) in 50 ml. of chloroform was added dropwise over a three-hour period a solution of 89 ml. of bromine in 50 ml. of chloroform. The reaction mixture was allowed to stand at room temperature for one hour. The chloroform was then stripped off under vacuum to give a brown solution which was distilled to give 179 g. of product which boiled at 85–118° C. at 25 mm. pressure. This liquid product crystallized at 5° C.

(c) To a solution of 243 g. of triphenyl phosphine in 2 l. of tetrahydrofuran was added with stirring 179 g. of the bromoketone from (b). White crystals precipitated immediately. The reaction was stirred for 8 days. The white crystals were removed by filtration and washed with tetrahydrofuran to give 282 g. of product melting at 192–193° C. The Wittig reagent was recovered from the salt by dissolving the salt in methanol and adding potassium carbonate solution. This mixture was stirred for approximately five minutes, the methanol was removed by stripping, and the mixture was extracted with ether. Evaporation of the ether extract left the desired Witting reagent.

EXAMPLE 13

To a solution of 0.141 g. of the cyclopentenal from Example 11 in 10 ml. of 2B ethanol was added a solution of 0.178 g. of the Wittig reagent from Example 12 in 10 ml. of 2B ethanol. This reaction mixture was heated under reflux under a nitrogen atmosphere for 18 hours. The mixture was stripped to dryness and the residue was chromatographed on a silica column using a weight ratio of product to silica of 1:20 and a solvent consisting of 20 percent chloroform and 80 percent benzene. There was obtained a 43 percent yield of a ketone having structure (XIV). The nuclear magnetic resonance and ultraviolet spectra were consistent with this structure and the molecular weight of 392 was confirmed by a high resolution mass spectrometer.

*Analysis.*—Calculated for $C_{23}H_{36}O_5$ (percent): C, 70.37; H, 9.24. Found (percent): C, 70.08; H, 9.45.

EXAMPLE 14

A solution of 0.223 g. of the ketone from Example 13 in 10 ml. of dry tetrahydrofuran was added dropwise to a solution of 0.107 g. of sodium borohydride in 10 ml. of dry tetrahydrofuran. The solution turned yellow in color. The reaction mixture was heated under reflux in a nitrogen atmosphere for two hours and was then extracted with ether. The ether extract was washed with saturated sodium chloride solution until it became clear. The ether solution was dried over sodium sulfate and evaporated to give 201 mg. of a yellow oil. This material was chromatographed on silica at a ratio of 1:33 using a solvent which was initially 20 percent chloroform and 80 percent benzene and finishing with 100 percent chloroform. There were obtained 47 mg. of a fast-moving material and 49 mg. of a slower-moving material. These two materials were shown to be diasteroisomers of the desired alcohol. High resolution mass spectrometry showed both to have a molecular weight of 394, which is consistent with structure (XV), which has an empirical formula of $C_{23}H_{38}O_5$. In addition, the nuclear magnetic resonance spectra of the two isomers were essentially identical as were the infrared and ultraviolet spectra. Further, either isomer can be oxidized to the original ketone by treatment with manganese dioxide.

EXAMPLE 15

To a solultion of 0.064 g. of the mixture of diasteroisomers from Example 14 in 30 ml. of acetone was added 0.0280 g. of p-toluenesulfonic acid. This mixture was then concentrated on a rotary evaporator in an ice bath at 10 mm. pressure. The time required for evaporation was approximately seven minutes. To the residue was added 6.4 ml. of acetone and the solution was spotted directly on a thin-layer chromatography plate. The chromatogram indicated no reaction had taken place. The volume was made up to 30 ml. by the addition of acetone and the mixture was again concentarted, this time at 27° C. To the residue was added 6 ml. of acetone and again the solution was spotted directly on a thin-layer chromatography plate. This chromatogram showed no starting material. The solution was stripped to dryness, the residue was extracted with ether, the ether extract was washed once with 50 ml. of saturated sodium bicarbonate and twice with 50 ml. of saturated sodium chloride solution, dried over sodium sulfate, and evaporated to give 57 mg. of a yellow oil. Chromatography on florisil at a ratio of 1:430 using initially a solvent consisting of 10 percent chloroform and 90 percent benzene and slowly increasing chloroform to 100 percent resulted in the isolation of 27 mg. of a fast-moving material and 47 mg. of a slower-moving material. This slower-moving material absorbed at 233 nanometers and 278 nanometers. These two absorption bands were ascribed to the positions of the double bonds in the isomeric compounds, (XVI) and (XVII). Further purification by preparative thin-layer chromatography gave a single-spot material which was shown by high resolution mass spectrometry to have a molecular weight of 350. This molecular weight is that expected for a compound having the Formula $C_{21}H_{34}O_4$.

EXAMPLE 16

Isomerization of the ring double bond of Compound XVI to the position of Compound XVII can be effected by treating with sodium hydroxide. When the product from Example 15 was treated with 1 N sodium hydroxide in ethanol there was a decrease in the absorbance at 233 nanometers and an increase in the absorbance at 278 nanometers. The absorbance at 278 nanometers has been shown for $PGB_1$ and would be expected for the methyl ester of $PGB_1$.

EXAMPLE 17

The methyl ester of $PGB_1$, Compound XVII, is converted to the free acid by heating with sodium hydroxide to saponify the ester followed by acidification to release the free acid.

In Step L of our process two isomeric cyclopentenals depicted by the Formulae XII and XIII are formed. Compound XII is used in the synthesis of $PGB_1$. It is also possible to treat Compound XIII in the same manner as Compound XII is treated in order to obtain an isomer of $PGB_1$. The sequence of reactions involved in the synthesis of this isomer is shown by the following series of equations.

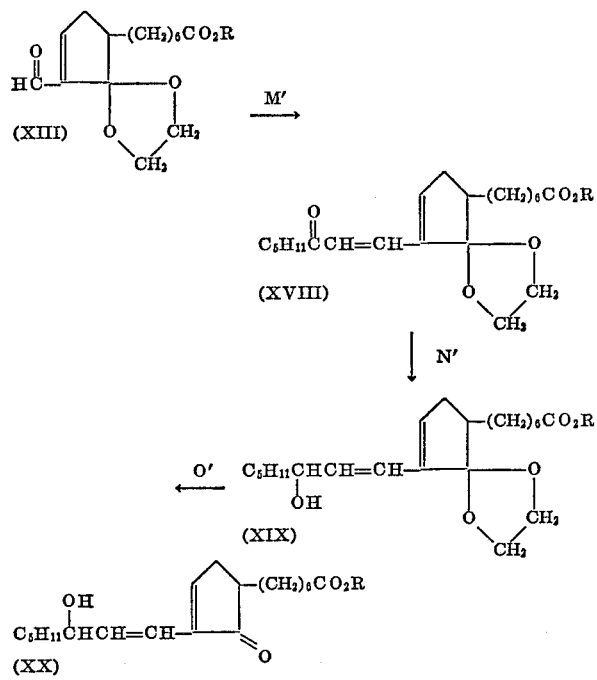

Of course, Compound XX may be subjected to basic hydrolysis followed by neutralization in order to obtain the free acid from the ester. This sequence of reactions is illustrated by the following examples.

EXAMPLE 18

To a solution of 0.206 g. of Compound XIII from Example 11 dissolved in 30 ml. of 2B ethanol was added a solution of 0.286 g. of the Wittig reagent from Example 12 in 30 ml. of 2B ethanol. The system was flushed with nitrogen and heated under reflux in a nitrogen atmosphere with stirring for 15 hours. The solution turned yellow in color. The reaction mixture was evaporated to dryness and the residue was chromatographed on silica at a ratio of 1:40 using a solvent consisting of 20 percent chloroform and 80 percent benzene to give 160 mg. of product. The nuclear magnetic resonance, ultraviolet, and infrared spectra were consistent with structure (XVIII). High resolution mass spectrometry showed the product to have a molecular weight of 392.26 which is also consistent with structure (XVIII).

Analysis.—Calculated for $C_{23}H_{36}O_5$ (percent): C, 70.37; H, 9.25. Found (percent): C, 70.60; H, 9.38.

EXAMPLE 19

To a solution of 1.29 g. of the ketone from the preceding example in 130 ml. of methanol was added, under nitrogen, 126 mg. of sodium borohydride in 21 ml. of methanol. The solution turned yellow in color. The reaction mixture was stirred at room temperature for two hours and then 25 ml. of water was added. The mixture was acidified to a pH of 5 using 75 percent acetic acid while cooling the mixture to 0° C. in a salt-ice bath. The mixture was extracted with ether and the ether extract was washed successively with sodium bicarbonate solution and sodium chloride solution, dried over sodium sulfate, and evaporated to 7.07 g. of oil. Thin-layer chromatography showed only one major material. The product was purified by chromatography on silica at a 1:20 ratio employing 30 percent chloroform, 70 percent benzene as solvent. The nuclear magnetic resonance, infrared, and ultraviolet spectra are consistent with the expected structure (XIX). High resolution mass spectrometry showed the product to have a molecular weight of 394.27 as compared to the calculated molecular weight of 394.53.

Analysis.—Calculated for $C_{23}H_{36}O_5$ (percent): C, 70.01; H, 9.71. Found (percent): C, 69.68; H, 9.62.

EXAMPLE 20

To a solution of 0.718 g. of the ketal from the preceding example in 150 ml. of acetone was added 0.066 g. of p-toluenesulfonic acid with stirring. A yellow color developed. The reaction was allowed to proceed for two hours under nitrogen with stirring. The reaction mixture was extracted with ether and the ether extract was washed successively with sodium bicarbonate and sodium chloride solutions, dried over sodium sulfate, and evaporated to 638 mg. of a dark oil. The product was purified by chromatography on silica at a 1:25 ratio, starting with a solvent consisting of 220 percent chloroform and 80 percent benzene and slowly increasing the chloroform content to 100 percent chloroform. The nuclear magnetic resonance, infrared, and ultraviolet spectra are consistent with the expected structure (XX). The molecular weight by high resolution mass spectrometry was 350.25 which is consistent with the formula $C_{21}H_{34}O_4$.

Analysis.—Calculated for $C_{21}H_{34}O_4$ (percent): C, 71.96; H, 9.78. Found (percent): C, 71.50; H, 10.04.

EXAMPLE 21

To obtain the free acid from the ester from the preceding example, 102 mg. of the ester was dissolved in 15 ml. of methanol. To the solution was added, under nitrogen, 125 mg. of sodium carbonate in 15 ml. of water. This reaction mixture was heated for one hour at 60° C. then cooled in ice to 10° C. and acidified to a pH of 2 using 50 percent hydrochloric acid. The reaction mixture was extracted with ether and the ether extract washed with water, made basic with 1 N sodium hydroxide, and reacidified, while cooling, with 1 N hydrochloric acid. The ether extract was then washed with water and saturated sodium chloride solution, dried over sodium sulfate, and evaporated to give 84.6 mg. of the desired acid.

It is also possible to subject various intermediates in our process to other reactions to obtain compounds that are structurally similar to the prostaglandins. For example, the ketal/ketone (XIV) may be subjected to acid hydrolysis to remove the ketal blocking group and yield a diketone. This reaction is depicted by the following equation.

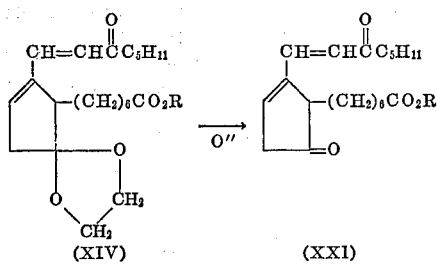

(XIV)                    (XXI)

The conversion of (XIV) to (XXI) involves the acid hydrolysis of a ketal to yield the ketone. This is the same as Step O in the main process. The hydrolysis may be accomplished by the use of a strong sulfonic acid or a strong mineral acid. For example, p-toluenesulfonic acid, hydrochloric acid, or sulfuric acid may be used. This hydrolysis will be further illustrated by the following example.

EXAMPLE 22

To a solution of 0.142 g. of the ketal (XIV) in 50 ml. of acetone was added 0.142 g. of p-toluenesulfonic acid. The system was flushed several times with nitrogen and the reaction mixture was heated under reflux in a nitrogen atmosphere for 24 hours. The mixture was extracted with ether and the ether extract washed with saturated sodium chloride solution, dried over sodium sulfate, and evaporated to give 155 mg. of yellow oil. The yellow oil was chromatographed on silica at a ratio of 1:32 using 30 percent chloroform, 80 percent benzene as solvent to give 52 mg. of a product which showed to be single-spot material by thin-layer chromatography. The infrared, ultraviolet, and nuclear magnetic resonance spectra of the product were consistent with the expected structure (XXI). In addition, the molecular weight as determined by high resolution mass spectrometry was the expected 348.

Analysis.—Calculated for $C_{21}H_{32}O_4$ (percent): C, 72.38; H, 9.26; O, 18.37. Found (percent): C, 71.70; H, 9.30; O, 18.12.

It is to be understood that Compound XXI can be hydrolyzed to the free acid. It is also to be understood that Compound XXI may be prepared in other ways and that other compounds may be obtained from the intermediates of our process. For example, Compound XXI may be obtained by the oxidation of the hydroxyl group in the side chain of Compound XVI. This oxidation may be accomplished by the use of a mild oxidizing agent such as manganese dioxide.

The diketone (XXI) is reduced on treating with lithium aluminum tri-t-butoxy hydride to the hydroxyl ketone (XXII).

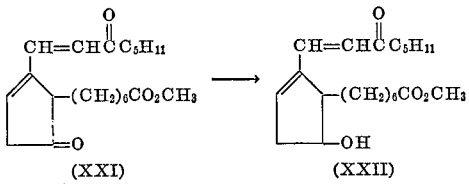

(XXI)                    (XXII)

Compound XXII is a new synthetic prostaglandin which causes a decrease in blood pressure upon administration. The conversion of (XXI) to (XXII) is illustrated by the following example.

EXAMPLE 23

A solution of 0.182 g. of the diketone (XXI) in 20 ml. of tetrahydrofuran freshly distilled from lithium aluminum hydride was cooled to −74° C. in a Dry Ice/isopropanol bath. To this cooled solution was added a solution of 0.140 g. of lithium aluminum tri-t-butoxy hydride in 20 ml. of freshly distilled tetrahydrofuran over a 13-minute period, with stirring and under nitrogen. Stirring was continued under nitrogen at −74° C. for one hour. The mixture was then warmed to room temperature and held there for 30 minutes. The product was extracted from the mixture with ether, the ether extract was washed with saturated sodium chloride solution, dried over sodium sulfate, and evaporated to give 158 mg. of a brown oil. The product was purified by chromatography over silica using a 20 percent chloroform/80 percent benzene solvent and a product to silica weight ratio of 1:11. The infrared and ultraviolet spectra were consistent with structure (XXII) and the molecular weight of 350 was confirmed by mass spectroscopy.

In the course of our work we have discovered a method for the preparation of the naturally occurring prostaglandin, $PGB_1$, and in addition have prepared two heretofore unknown synthetic prostaglandins, compounds (XVI) and XXII). These two new prostaglandins have the formulae:

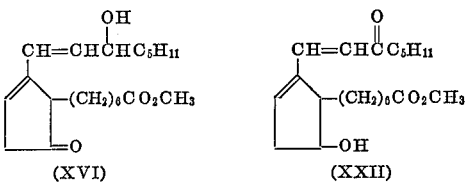

(XVI)                    (XXII)

It is to be understood that these compounds may exist as free acids, or the methyl group may be replaced by such groups as ethyl, propyl, t-butyl, nonyl, 2,2,2-trichloroethyl, benzyl, and diphenylmethyl.

These new prostaglandins exhibit many of the desirable characteristics of the prostaglandin family but surprisingly are free from many of the undesirable effects. For example, both these compounds cause a marked decrease in blood pressure, which is characteristic of the prostaglandin; however, neither compound causes contraction or relaxation of smooth muscle tissue, which is another characteristic of the naturally occurring prostaglandins.

The effect of Compounds XVI and XXII on the blood pressure of an anesthetized rabbit was determined according to standard procedures. The animals employed were male New Zealand White rabbits anesthetized with urethane (1.25 g. 1 kg.) or Nembutal (25 mg. 1 kg.). The animal was prepared for recording of blood pressure using the Statham pressure transducer. The compound was dissolved in ethanol-water and the solution was administered via the femoral vein. Results are given as follows: (a) mean blood pressure just prior to administration of the compound; (b) mean blood pressure after administration; and (c) the change in blood pressure. The results are summarized in the following table.

| Compound: | Dosage, µg./kg. | Results | |
|---|---|---|---|
| XXII | 100 | (1) | (1) |
| XXII | 200 | 70/54 | −16 |
| XVI | 200 | 60/46 | −14 |
| XVI | 400 | 64/44 | −16 |
| XXII | 200 | 44/12 | −32 |
| XXII | 100 | 36/20 | −16 |
| XXII | 50 | 135/110 | −25 |
| XXII | 100 | 130/105 | −25 |
| XXII | 200 | ² 130/85 | −45 |
| XXII | 300 | 50/20 | −30 |
| XXII | 300 | 50/30 | −20 |
| XXII | 50 | 50/20 | −20 |
| XXII | 50 | 40/20 | −20 |

¹ No expect.
² Animal expired.

Key intermediates in the above-described process are compounds having the formula

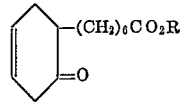

wherein R is hydrogen, $C_1$–$C_{12}$ alkyl, $C_1$–$C_6$ haloalkyl, $C_5$–$C_8$ t-alkenyl, $C_5$–$C_8$ t-alkynyl, benzyl, methoxybenzyl, nitrobenzyl, benzhydryl or phenacyl. The free carboxyl group is esterified to protect it during the subsequent steps of the process. Any ester group that will provide such protection may be employed and is to be considered to be equivalent to those described above. Halo is intended to mean fluoro, chloro and bromo. Specific examples of values which R may assume include methyl, ethyl, t-butyl, nonyl, 2-ethylhexyl, dodecyl, 3-methyl-1-buten-3-yl, 3-methyl-1-butyn-3-yl, 2,2,2-trichloroethyl, 3-bromobutyl, p-methoxybenzyl and p-nitrobenzyl. Other groups equivalent to those named will be readily apparent to those skilled in the art.

We claim:

1. A compound having the formula

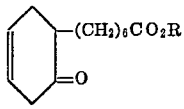

wherein R is hydrogen, $C_1$–$C_{12}$ alkyl, $C_1$–$C_6$ haloalkyl wherein each halogen is fluorine, chlorine or bromine, $C_5$–$C_8$ t-alkenyl, $C_5$–$C_8$ t-alkynyl, benzyl, nitrobenzyl, methoxybenzyl, benzhydryl or phenacyl.

2. A compound as in claim 1 wherein R is hydrogen.
3. A compound as in claim 1 wherein R is methyl.

References Cited
UNITED STATES PATENTS 3,400,158   9/1968   Roberts _____ 260—587

JAMES A. PATTEN, Primary Examiner

R. GERSTL, Assistant Examiner

U.S. Cl. X.R.

260—468 D, 514 D, 514 K